July 20, 1954 R. J. CONTE 2,683,956
TOY AUTOMOBILE
Filed May 16, 1949 2 Sheets-Sheet 1
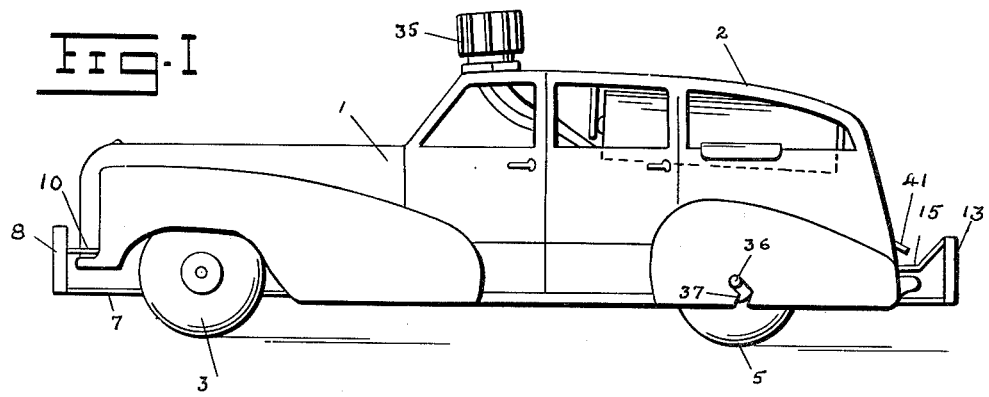
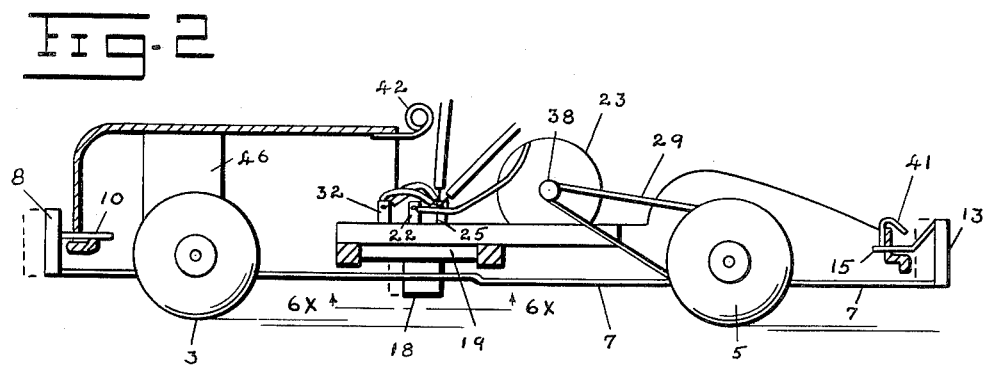
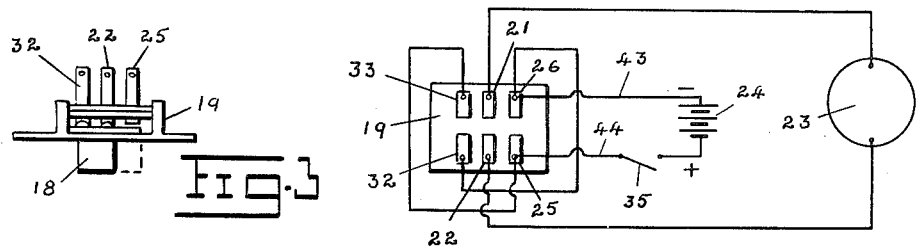
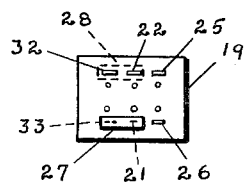
INVENTOR.
Robert J. Conte
BY

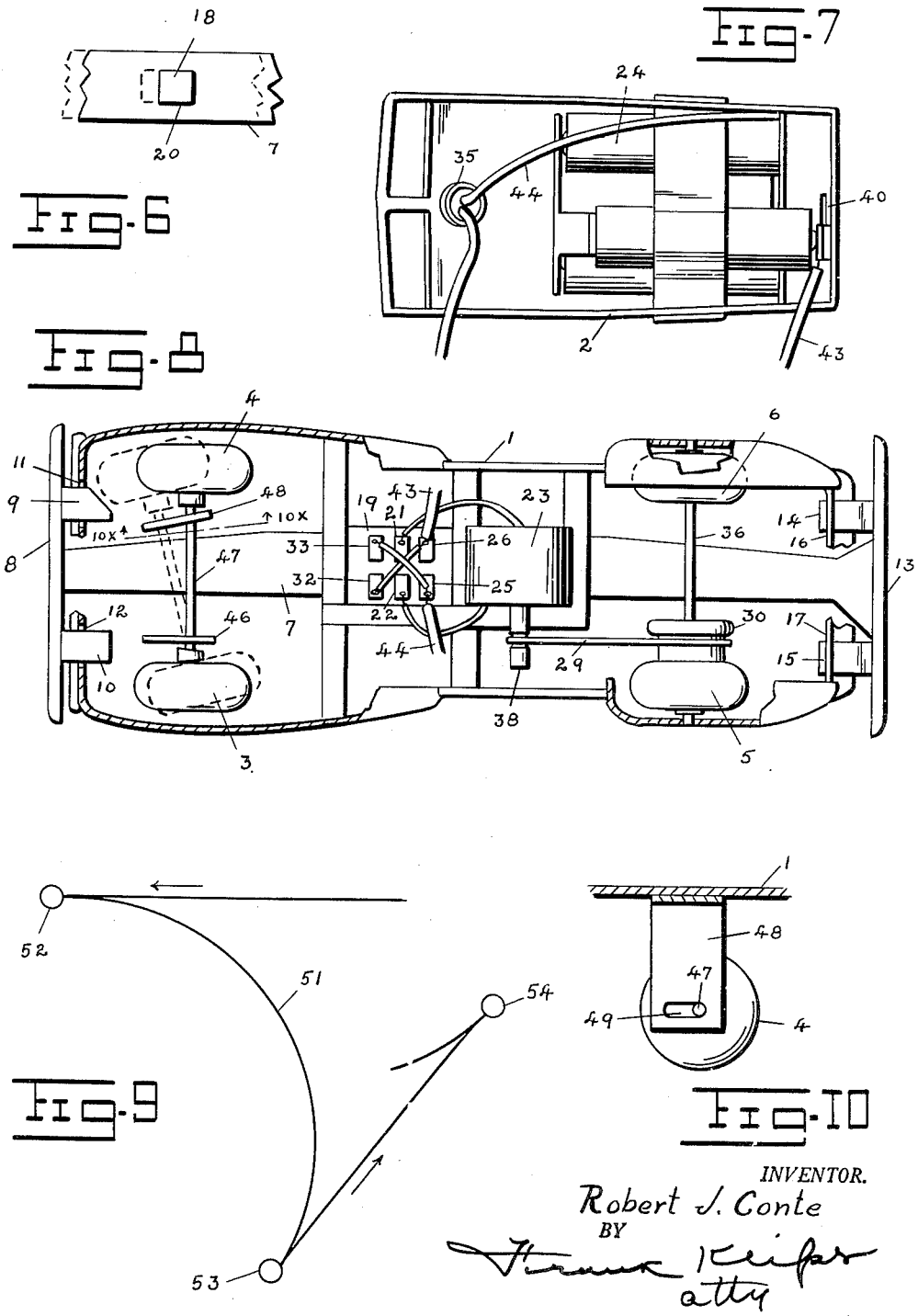

Patented July 20, 1954

2,683,956

UNITED STATES PATENT OFFICE 2,683,956

TOY AUTOMOBILE

Robert J. Conte, Rochester, N. Y.

Application May 16, 1949, Serial No. 93,480

2 Claims. (Cl. 46—212)

The object of this invention is to provide a new and improved toy automobile.

Another object of the invention is to provide a toy automobile that will run forward until it hits an obstruction and will then automatically reverse itself and run backward.

Another object of the invention is to provide an automobile that will reverse itself when it hits an obstruction and will run backward in a different direction when it hits an obstruction, and will continue to run backward until it hits another obstruction and will then run forward again in a different direction.

Another object of the invention is to provide an automobile that will run forward in one direction until it hits an obstruction and will then run backward on a curve.

Another object of the invention is to provide the car with bumpers that can be moved back and forth, which bumpers are connected together by a beam that moves with them.

Another object of the invention is to provide an automobile that is driven by a motor that is driven by a battery carried by the automobile, the direction of the flow of current being changed each time either bumper of the automobile strikes an obstruction.

These and other objects of the invention will be illustrated in the drawings, described in the specification and pointed out in the claims at the end thereof.

In the drawings:

Figure 1 is a side elevation of the automobile showing a bumper at each end.

Figure 2 is a longitudinal sectional elevation of the automobile showing the location of the various parts thereof that constitute this invention.

Figure 3 is a side elevation of the double pole, double throw commutating or reversing switch.

Figure 4 is a bottom plan view of the switch shown in Figure 3 the button having been removed.

Figure 5 is a diagrammatic view of the connections between the battery, switch and motor.

Figure 6 is a bottom plan view partly broken away of the beam that connects the two bumpers, the part that is shown being indicated by the line 6x, 6x in Figure 2.

Figure 7 is a bottom plan view of the upper or top part of the car that holds the battery.

Figure 8 is a top plan view of the body of the car after the top part of the car shown in Figure 7 is removed, the hood of the car being sectioned away to expose the front wheels.

Figure 9 is a diagrammatic view of a pattern of the path which the car will follow in moving backward and forward.

Figure 10 is a section on the line 10x, 10x of Figure 8 showing a side elevation of the bracket support for the front axle.

In the drawings, like reference numerals indicate like parts.

In the drawings reference numeral 1 indicates the body of a toy automobile having an upper housing 2 thereon and having front wheels 3 and 4 and rear wheels 5 and 6. Carried under the body or the reach frame of the automobile or car is a sliding beam 7 on the forward end of which is a bumper 8 having brackets 9 and 10 extending rearwardly therefrom which engage in slots 11 and 12 formed in the body of the car in which they can slide back and forth. At the rear of the car fastened to the beam 7 is a similar bumper 13 having brackets 14 and 15 thereon that engage in slots 16 and 17 formed in the body of the car in which they can slide back and forth. The beam 7 and the bumpers 8 and 13 form a unit that slides back and forth under the bottom of the car and can be moved back and forth manually or will be moved back and forth every time either bumper strikes an obstruction.

Suitably mounted in the body of the car is a sliding button 18 that constitutes part of the commutating switch 19 and is used for throwing the switch either forward or back. In the beam 7 is a hole 20 in which the button or handle 18 of the switch engages.

When the car moves forward, the bumper 8 can strike an obstruction which moves it from the dotted line position to the full line position as shown at the left in Figure 2, causing the handle or button 18 of the switch to move from one end of its throw to the other end. That is, from the left hand side of the switch that is shown in Figures 3 and 4 to the right hand side of the switch.

It will be understood that the switch shown in the various figures of the drawings of this case is a switch of a standard type, in which there are three contacts on each side as shown in Figure 4, in which the middle contacts 21 and 22 are connected directly to the motor 23. From these contacts the motor is turned first in one direction and then in the other direction. The battery 24 is connected to the contacts 25 and 26. The sliding button 20 carries two bridges or sliding contacts 27 and 28, one on each side. The bridge 27 connects, for the time being, between the contacts 21 and 26 and the bridge 28 connects the contact 22 with the contact 25. This will cause the motor 23 to turn in one direction and this will drive the belt 29, which in turn passes around a drum 30 on one of the rear wheels and drives the assembly of the two rear wheels and the axle which are all positively fastened together. This will drive the car backward until the bumper 13 strikes an obstruction, which will cause the bar 7 to move forward relative to the body of the car, and will move the handle or button 18 forward and carry the sliding contacts or bridges 27 and 28 out of contact with the stationary contacts 25 and 26 and into contact with the stationary contacts 32 and 33. This will change the direction of the flow of current from the battery to the motor and cause the motor to turn in the reverse direction, driving the car forward. This change in the direction of the flow of current is secured by the connections shown on the well-known wiring diagram shown in Figure 5 in which the stationary contact 26 on the upper side and right end of the switch is permanently cross connected to the stationary contact 32 on the lower side at the left end of the switch, and the contact 25 on the lower side and the right hand end of the switch is permanently cross connected to the contact 33 on the upper side of the switch at the left hand end as shown in Figure 5. When the sliding contacts 27 and 28 move from the right in Figures 4 and 5 to the left, the contacts 25 and 26 are cut out and left idle and the contacts 32 and 33 are cut into the circuit and become active, driving the motor in the reverse direction so that the car is driven forward.

In the circuit shown in Figure 5 is a switch 35 which can be opened manually for the purpose of stopping the motor. This switch can be opened or closed at will for the purpose of stopping or starting the motor. When the motor is once started the car will continue to run forward and back until the battery is run down or the switch 35 is opened.

A short rubber band can be conveniently used as the belt 29. From time to time, this belt must be replaced and in such case it must be passed over the wheel 5 so as to get it into contact with the drum 30. In order to remove the old belt and put on a new belt it is necessary to detach one end of the rear axle 36 from the body or frame of the automobile. For this purpose, I provide a slot 37 in the housing as shown in Figure 1 through which the end of the axle can be moved so as to leave the end of the axle and the wheel open so that the belt can be passed over the wheel. The pulley 38 on the motor is always exposed and the belt can be placed on the pulley or removed therefrom at any time. The upper portion 2 or housing of the car is detachable from the body of the car.

For this purpose the shell of the housing 2 is slotted as indicated at 40 in Figure 7 and this slot engages over the tongue 41 formed on the body of the car as shown in Figure 2. The front portion of the housing 2 engages over the spring detent 42 shown in Figure 2 so that between the tongue 41 and the detent 42 the housing 2 is held on the main body of the car.

On the inside of the housing 2 are carried the dry cells which constitute the battery 24 as shown in Figure 5. These cells are connected to the contacts 25 and 26 by the wires 43 and 44 and in the wire 44 is placed the switch 35 shown at the top of Figure 1. These wires are long enough to permit the removal of the upper housing 2 for the purpose of replacing the battery.

If the front axle were rigid the car would run forward and back in a straight line. As I have mounted the axle 47 the car will always run forward in a straight line, but to make the car change its direction when it runs back, I have provided a bearing for the axle in which it can move forward and back at one end, the other end of the axle being held stationary.

For this purpose I have provided a bracket 46 in which is a round hole and in which the front axle 47 is mounted. This bracket is substantially parallel to the long axis of the car. I have also provided a bracket 48 which is placed at an angle to the long axis of the car and in this bracket I provide a slot 49 in which the axle 47 can swing back and forth on a center in the bracket 46. This axle is rigid with the wheels and loosely engages the round hole in the bracket 46 and the slot 49 in the bracket 48. When the car moves to the left in Figure 8 the axle stands at right angles to the long axis of the car.

When the front bumper strikes an obstruction, such as is shown at 52 in Figure 9, the commutating switch is thrown and the car starts back and the front axle 47 swings from the full line position to the dotted line position in Figure 8 and then the car travels in a curve indicated at 51 in Figure 9 until the rear bumper strikes an obstruction 53 and then the commutating switch is thrown again and the car moves forward in a straight line until it strikes an obstruction 54 which causes it to reverse itself and it then travels back in a curve and this will continue as long as the battery holds out and as long as the bumpers continue to hit obstructions from time to time.

I claim:

1. In an automobile, the combination of a body structure, a front axle therefor, spaced wheels mounted thereon and having at least one wheel fixed to rotate with the axle, a bracket parallel to the long axis of the car, depending from the body structure having a round bearing therein with a fixed axis for loosely journaling one end of the axle, a bracket depending from the body at the other end of the axle having an elongated horizontal slot therein with a smooth uninterrupted upper surface extending from end to end on which the other end of the axle can freely roll back and forth from either end, means for driving the automobile in either direction, and bumper means for reversing said driving means when the automobile strikes an obstruction whereby the reversal of travel of said automobile causes the wheel adjacent said other end of said front axle to coact with the upper running surface and to roll said other end of said axle freely and independent of said bumper means from one end of the slot to the other after travel direction changes, to vary the course of travel of said automobile.

2. In an automobile, the combination of a body structure, a front axle therefor, spaced wheels mounted thereon and having at least one wheel fixed to rotate with the axle, a bracket parallel to the long axis of the car, depending from the body structure having a round bearing therein with a fixed axis for loosely journaling one end of the axle, a bracket depending from the body at the other end of the axle having an elongated horizontal slot therein with a smooth uninterrupted upper surface extending from end to end on which the other end of the axle can freely roll back and forth from either end, the forward end of the second bracket being tilted toward the first-named bracket, means for driving the automobile in either direction, and bumper means for reversing said driving means when the automobile strikes an obstruction whereby the reversal of travel of said automobile causes the wheel adjacent said other end of said front axle to coact with the upper running surface and to roll said other end of said axle freely and independent of said bumper means from one end of the slot to the other after travel direction changes, to vary the course of travel of said automobile.

References Cited in the file of this patent

UNITED STATES PATENTS

| Number | Name | Date |
|---|---|---|
| 769,802 | Lehmann | Sept. 13, 1904 |
| 782,076 | Soule | Feb. 7, 1905 |
| 1,101,060 | Clark | June 23, 1914 |
| 1,150,727 | Alexander | Aug. 17, 1915 |
| 1,208,572 | Kingsbury | Dec. 12, 1916 |
| 1,431,564 | Brilstra | Oct. 10, 1922 |
| 1,490,125 | O'Leary | Apr. 15, 1924 |
| 1,678,785 | Pfaffenberger | July 31, 1928 |
| 1,730,296 | Richter | Oct. 1, 1929 |
| 1,908,942 | Andes | May 16, 1933 |
| 1,967,524 | Allen | July 24, 1934 |
| 1,988,396 | Pellerin | Jan. 15, 1935 |
| 2,146,021 | Lohr | Feb. 7, 1939 |
| 2,179,913 | Bess | Nov. 14, 1939 |
| 2,488,464 | Arpin | Nov. 15, 1949 |

FOREIGN PATENTS

| Number | Country | Date |
|---|---|---|
| 848,085 | France | Oct. 23, 1939 |